US011859997B2

(12) United States Patent
Choi et al.

(10) Patent No.: US 11,859,997 B2
(45) Date of Patent: Jan. 2, 2024

(54) ELECTRONIC DEVICE FOR GENERATING MAP DATA AND OPERATION METHOD THEREOF

(71) Applicant: SAMSUNG ELECTRONICS CO., LTD., Suwon-si (KR)

(72) Inventors: Mideum Choi, Suwon-si (KR); Changsoo Park, Suwon-si (KR); Inhak Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 715 days.

(21) Appl. No.: 16/978,907

(22) PCT Filed: Mar. 6, 2019

(86) PCT No.: PCT/KR2019/002599
§ 371 (c)(1),
(2) Date: Sep. 8, 2020

(87) PCT Pub. No.: WO2019/194424
PCT Pub. Date: Oct. 10, 2019

(65) Prior Publication Data

US 2021/0048312 A1 Feb. 18, 2021

(30) Foreign Application Priority Data

Apr. 4, 2018 (KR) ........................ 10-2018-0039342

(51) Int. Cl.
*G01C 21/00* (2006.01)
*G06T 7/207* (2017.01)
(Continued)

(52) U.S. Cl.
CPC ..... *G01C 21/3848* (2020.08); *G01C 21/1656* (2020.08); *G06T 7/207* (2017.01); *G06T 7/74* (2017.01); *G06T 2207/30244* (2013.01)

(58) Field of Classification Search
CPC ............ G01C 21/3848; G01C 21/1656; G01C 21/005; G01C 21/3837; G06T 7/207;
(Continued)

(56) References Cited

U.S. PATENT DOCUMENTS 9,103,680 B2 8/2015 Kojima et al.
9,230,366 B1 * 1/2016 McClendon ............ G06T 17/05
(Continued)

FOREIGN PATENT DOCUMENTS

DE 102017126925 A1 * 5/2018 ........... G05D 1/0248
GB 2533295 A * 6/2016 ............. G01C 21/28
(Continued)

OTHER PUBLICATIONS

Vivacqua et al.; A Low Cost Sensors Approach for Accurate Vehicle Localization and Autonomous Driving Application; Sensors (Basel, Switzerland); vol. 17, 10 2359; Oct. 16, 2017 (Year: 2017).*
(Continued)

*Primary Examiner* — Michael J Zanelli
(74) *Attorney, Agent, or Firm* — Nixon & Vanderhye, P.C.

(57) ABSTRACT

Provided are an electronic device for generating map data and an operating method of the electronic device. The operating method of the electronic device includes: obtaining image data of a first resolution and image data of a second resolution for each of a plurality of nodes generated while the electronic device moves; obtaining location information with respect to each of the generated nodes, by using the image data of the second resolution; generating and storing map data by matching the obtained location information with the image data of the first resolution for each node; and estimating a current location of the electronic device by using the generated map data and the image data of the first resolution.

17 Claims, 8 Drawing Sheets

OBTAIN IMAGE DATA OF FIRST RESOLUTION AND IMAGE DATA OF SECOND RESOLUTION FOR EACH OF PLURALITY OF NODES GENERATED WHILE ELECTRONIC DEVICE MOVES — 810

OBTAIN LOCATION INFORMATION WITH RESPECT TO EACH NODE BASED ON IMAGE DATA OF SECOND RESOLUTION — 820

GENERATE AND STORE MAP DATA BY MATCHING LOCATION INFORMATION WITH RESPECT TO EACH NODE WITH IMAGE DATA OF FIRST RESOLUTION FOR EACH NODE — 830

ESTIMATE CURRENT LOCATION OF ELECTRONIC DEVICE BY USING MAP DATA AND IMAGE DATA OF FIRST RESOLUTION — 840

(51) Int. Cl.
*G06T 7/73* (2017.01)
*G01C 21/16* (2006.01)

(58) Field of Classification Search
CPC . G06T 7/74; G06T 2207/30244; G06T 17/05; G01S 19/14; G09B 29/00; G09B 29/003
See application file for complete search history.

(56) References Cited

U.S. PATENT DOCUMENTS

| | | | |
|---|---|---|---|
| 9,562,778 B2 | 2/2017 | DuHadway et al. | |
| 9,637,119 B2 | 5/2017 | Kim | |
| 2011/0082642 A1 | 4/2011 | Magnussen | |
| 2012/0300979 A1* | 11/2012 | Pirchheim | G06T 7/246 382/103 |
| 2015/0378015 A1 | 12/2015 | You et al. | |
| 2017/0307746 A1* | 10/2017 | Rohani | G01S 13/931 |

FOREIGN PATENT DOCUMENTS

| | | |
|---|---|---|
| JP | 2014-041397 | 3/2014 |
| JP | 2016-014647 | 1/2016 |
| KR | 10-2011-0043538 | 4/2011 |
| KR | 10-2013-0002834 | 1/2013 |
| KR | 10-2015-0144125 | 12/2015 |
| KR | 10-1625486 | 5/2016 |
| KR | 10-1764222 | 8/2017 |

OTHER PUBLICATIONS

Badino et al.; Real-Time Topometric Localization; 2012 IEEE International Conference on Robotics and Automation RiverCentre, Saint Paul, Minnesota, USA May 14-18, 2012 (Year: 2012).*
Search Report dated Jun. 13, 2019 in counterpart International Patent Application No. PCT/KR2019/002599.
Written Opinion dated Jun. 13, 2019 in counterpart International Patent Application No. PCT/KR2019/002599.
Ground Penetrating Radar (GPR), Ollerhead & Associates Ltd. http://www.ollerhead.ca/technology/ground-penetrating-radar-gpr/, printed Dec. 2020.

* cited by examiner

ELECTRONIC DEVICE FOR GENERATING MAP DATA AND OPERATION METHOD THEREOF

This application is the U.S. national phase of International Application No. PCT/KR2019/002599 filed Mar. 6, 2019 which designated the U.S. and claims priority to KR Patent Application No. 10-2018-0039342 filed Apr. 4, 2018, the entire contents of each of which are hereby incorporated by reference.

BACKGROUND

Field

The disclosure relates to an electronic device for generating map data and an operating method thereof.

Description of Related Art

Recently, automobiles have been rapidly getting smarter due to integration of information and communication technologies and the automobile industry. By getting smarter, automobiles are not just mechanical devices, rather, they have evolved into smart cars. In particular, as a key technology of smart cars, autonomous driving has drawn attention.

An autonomous car refers to a vehicle that recognizes the surrounding environment and determines a driving situation to drive to a given destination under self-control, without intervention by a driver. In recent times, autonomous cars have attracted attention as a personal transportation means which could reduce traffic accidents, increase transportation efficiency, save fuel, and enhance convenience by replacing driving.

For such autonomous driving of cars, various technologies are required, such as technologies for recognizing surrounding environmental conditions such as traffic lanes, peripheral vehicles, pedestrians, etc., technologies for determining driving situations, and technologies for control of steering, acceleration/deceleration, etc. Particularly, among these technologies, technologies for accurately determining the surrounding environment of a vehicle are highly important. That is, it is necessary to generate a map containing a small error range and to precisely determine the surrounding environment of the vehicle on the generated map.

Under such conditions, for autonomous driving of various moving bodies including vehicles, the need for technologies for generating and using a map providing high reliability with respect to actual road situations has arisen.

SUMMARY

Provided are a method and an electronic device for generating map data. Provided is a computer-readable recording medium having recorded thereon a program for executing the method on a computer. Technical problems to be solved are not limited thereto. Other technical problems may exist.

DETAILED DESCRIPTION

Figure 1:
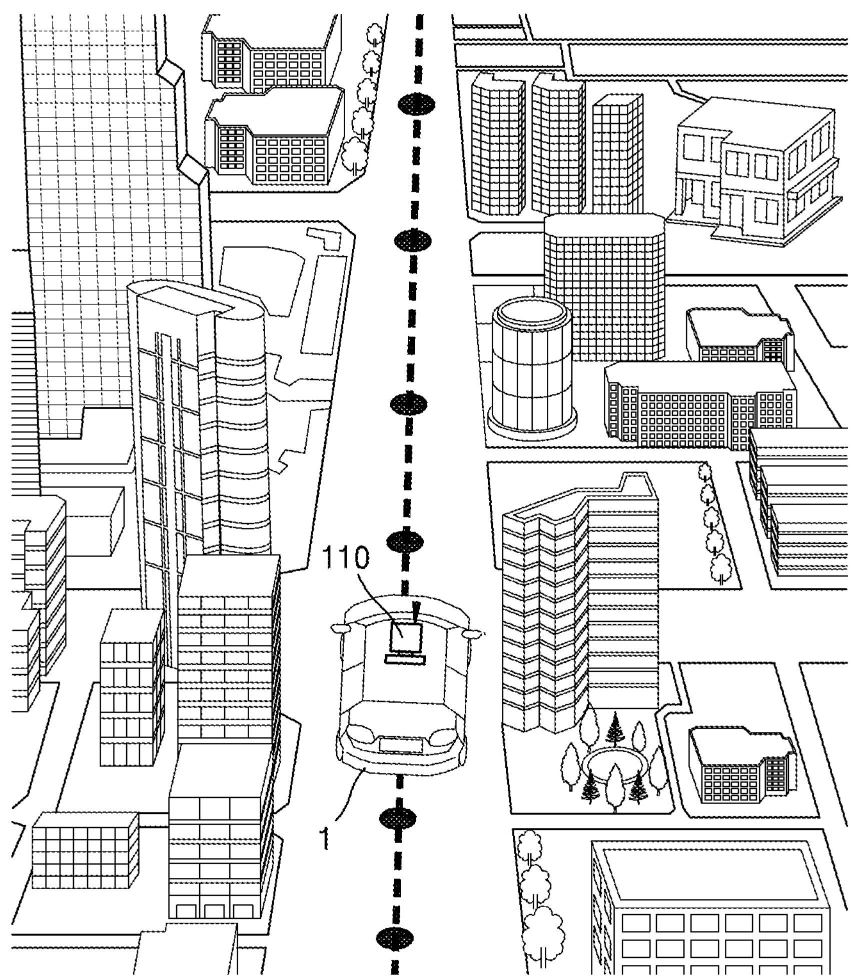
FIG. 1 is a view for describing an example of an operation of an electronic device according to an embodiment.

According to an aspect of the disclosure, an operating method of an electronic device includes: obtaining image data of a first resolution and image data of a second resolution for each of a plurality of nodes generated while the electronic device moves; obtaining location information with respect to each of the generated nodes, by using the image data of the second resolution; generating and storing map data by matching the obtained location information with the image data of the first resolution for each node; and estimating a current location of the electronic device by using the generated map data and the image data of the first resolution.

According to another aspect of the disclosure, an electronic device includes: at least one sensing portion configured to obtain image data of a first resolution and image data of a second resolution for each of a plurality of nodes generated while the electronic device moves; a memory storing one or more instructions; and a processor configured to execute the one or more instructions stored in the memory to: obtain location information with respect to each of the generated nodes by using the image data of the second resolution, generate map data by matching the obtained location information with the image data of the first resolution for each node, store the generated map data in the memory, and estimate a current location of the electronic device by using the generated map data and the image data of the first resolution.

According to another aspect of the disclosure, a computer-readable recording medium has recorded thereon a program for executing the operating method of the electronic device on a computer.

Hereinafter, embodiments of the disclosure will be described n detail with reference to the accompanying drawings so that one of ordinary skill in the art could easily execute the disclosure. However, the disclosure may have different forms and should not be construed as being limited to the embodiments described herein. Also, in the drawings, parts not related to descriptions are omitted for the clear description of the disclosure, and throughout the specification, like reference numerals are used for like elements.

Throughout the specification, when a part is referred to as being "connected" to other parts, the part may be "directly connected" to the other parts or may be "electrically connected" to the other parts with other devices therebetween. When a part "includes" a certain element, unless it is specifically mentioned otherwise, the part may further include another component and may not exclude the other component. Also, the terms, such as "unit" or "module," used in the specification, should be understood as a unit that processes at least one function or operation and that may be embodied in a hardware manner, a software manner, or a combination of the hardware manner and the software manner.

Hereinafter, embodiments of the disclosure will be described n detail with reference to the accompanying drawings so that one of ordinary skill in the art could easily execute the disclosure. However, the disclosure may have different forms and should not be construed as being limited to the embodiments described herein.

Hereinafter, the disclosure will be described in detail with reference to the accompanying drawings.

In this specification, a vehicle 1 may include an electronic device 100 (hereinafter, the electronic device 100) for assisting in or controlling driving of the vehicle 1.

FIG. 1 is a view for describing an example of an operation of an electronic device according to an embodiment.

Referring to FIG. 1, the electronic device 100 included in the vehicle 1 may generate map data by recognizing a surrounding environment through a sensing portion 110, while the vehicle 1 drives on the road.

According to an embodiment, image data of different resolutions may be obtained for a plurality of nodes generated while the vehicle 1 moves. The plurality of nodes may be non-continually generated while the vehicle 1 moves. According to an embodiment, the image data obtained for each node may include a 3D point cloud, image, etc. Also, the image data according to an embodiment may include a distribution chart indicating information sensed with respect to a two-dimensional or a three-dimensional space. However, the image data according to an embodiment is not limited to the example described above and may include various types of data indicating information collected about surrounding environmental conditions at a certain location.

The node according to an embodiment may correspond to a location of the vehicle 1 of the electronic device 100 when the image data is obtained.

According to an embodiment, the electronic device 100 may generate a plurality of nodes according to a time interval or a distance interval. However, it is not limited thereto, and the electronic device 100 may non-continually generate a plurality of nodes. For example, when a location of the electronic device 100 at a temporal point t is node A, a location of the electronic device 100 at a temporal point t+1 may correspond to node B adjacent to the node A. A path through which the vehicle 1 including the electronic device 100 drives may be a set of continual nodes.

According to an embodiment, when the vehicle 1 including the electronic device 100 moves, images of different resolutions including the surrounding environment of the vehicle 1 may be captured at the nodes.

The electronic device 100 may generate the map data by using image data of different resolutions. According to an embodiment, the electronic device 100 may obtain pose information of the vehicle 1 by using image data of a high resolution and may obtain location information for a current node by using the pose information of the vehicle. For example, the location information for the current node may be obtained by calculating a distance and a direction of movement of the vehicle from a location of a previous node, based on the pose information of the vehicle. The electronic device 100 may generate the map data by matching the location information of the current node with image data of a low resolution.

When generating the map data, it may be difficult to distinctly compare features of two images, by using only the image data of the low resolution, and thus, the electronic device 100 may have difficulty accurately obtaining location information corresponding to the image data of the low resolution. However, according to an embodiment, the electronic device 100 may obtain location information of the electronic device 100, the location information having high accuracy, by using image data of a high resolution, and may generate the map data including image data of a low resolution by using the location information.

According to an embodiment, the electronic device 100 may estimate a current location of the electronic device 100 by using the generated map data and image data of a first resolution (for example, the image data of the low resolution). For example, the electronic device 100 may estimate the current location of the electronic device 100 by obtaining, from among the image data of the first resolution of the map data, image data which is most closely matched to the image data of the first resolution, which is obtained with respect to the current location.

According to an embodiment, the electronic device 100 may determine a range for the current location of the electronic device 100 and estimate the current location by using map data corresponding to at least one node included in the determined range. The range for the current location of the electronic device 100 may include an area which may be estimated as the current location of the electronic device 100. The electronic device 100 may use the map data corresponding to the range for the current location, in order to minimize the amount of calculations taken to compare image data of the map data with image data obtained at the current location.

According to an embodiment, the range for the current location of the electronic device 100 may be determined based on at least one of information about a previous location of the electronic device 100 and global positioning system (GPS) information about the current location of the electronic device 100. For example, the electronic device 100 may determine the range which may include the current location based on the movement of the electronic device 100, based on the previous location. Also, the electronic device 100 may determine the range which may include the current location, based on the GPS information and an error bound of the GPS information. The disclosure is not limited to the example described above. The range for the current location of the electronic device 100 may be determined based on information collected using various methods with respect to the current location of the electronic device 100.

The pose information of the vehicle 1 according to an embodiment may include 6-degree-of-freedom information. The 6-degree-of-freedom information may include information about a direction in which a vehicle moves and rotation of the vehicle. For example, the 6-degree-of-freedom information may include at least one of x, y, z, roll, yaw, and pitch. The x, y, z values may include information about a direction (eg. a vector value) in which the vehicle moves. The roll value may be an angle of rotation in a counter-clockwise direction based on an x-axis, the yaw value may be an angle of rotation in a counter-clockwise direction based on a y-axis, and the pitch value may be an angle of rotation in a counter-clockwise direction based on a z-axis. The yaw value may indicate a movement direction of the vehicle 1 and the pitch value may indicate whether the vehicle 1 moves through a slope or a bump.

The pose information of the vehicle 1 may be obtained based on the number of rotations of a wheel of the vehicle 1 and a direction of the rotation, which are measured through an odometery sensor 230. However, the pose information measured through the odometery sensor 230 may have low accuracy, due to a slipping phenomenon generated between the wheel and a bottom surface. Thus, the electronic device 100 according to an embodiment may obtain the pose information of the vehicle 1, the pose information having high accuracy, by using image data of a second resolution and may obtain location information of the vehicle 1 based on the pose information.

According to an embodiment, the electronic device 100 may obtain the pose information of the vehicle from the plurality of nodes, by using the image data of the second resolution. For example, the electronic device 100 may obtain a difference value between the pose information of each node, by using the image data of the second resolution, and based on the difference value of the pose information, may obtain pose information for each node, the pose information being optimized to have the least error.

Also, the electronic device 100 may obtain location information for a current node of the vehicle 1, based on the pose information of the current node and a previous node and location information of the previous node. The pose information of the vehicle may include a direction in which the vehicle moves and a direction of the rotation. For example, the electronic device 100 may obtain the location information for the current node by obtaining information about a direction and a distance of the movement from the previous node to the current node, based on the pose information of at least one of the current node and the previous node.

Also, the electronic device 100 may generate the map data by matching image data of a first resolution (for example, a low resolution) with respect to the current node to the obtained location information of the current node of the vehicle 1.

The electronic device 100 according to an embodiment may obtain the image data from each node, through the sensing portion 110 including a radar sensor 226, a lidar sensor 227, an image sensor 228, etc. The image data of the first resolution described above may be generated by a sensor using radio waves, for example, the radar sensor 226. Also, the image data of the second resolution described above may be generated by a sensor using a laser beam or light, for example, the lidar sensor 227, the image sensor 228, etc.

For example, the electronic device 100 may obtain the image data of the first resolution (for example, the low resolution) by using the radar sensor 226 and obtain the image data of the second resolution (for example, the high resolution) by using at least one of the lidar sensor 227 and the image sensor 228.

Thus, according to an embodiment, without expensive equipment (for example, a lidar sensor) to capture an image of high resolution, estimation of a current location of a moving object is possible by using equipment (for example, a radar sensor) to capture an image of a low resolution with map data including the image data of the low resolution. Thus, according to an embodiment, by using the map data including the image data of the low resolution, accurate location estimation is possible by using only a less expensive device for capturing image data of a low resolution.

Also, when the image data of the second resolution (for example, the high resolution) described above includes image data, at which a difference of the pose information between adjacent nodes is to be identified, the image data of the second resolution may be used to obtain the pose information, according to an embodiment. Thus, the electronic device 100 may obtain the location information according to an embodiment by using the image data of the second resolution obtained by using for example a lidar sensor of a first channel having one beam. The electronic device 100 according to an embodiment may perform the operation according to an embodiment, without including an expensive lidar sensor having a plurality of beams.

Also, when the image data of the first resolution is an image generated by using radio waves, speed detection using a Doppler effect is possible with respect to an object in an image. A dynamic object having a speed is desirably excluded from image data, in generating the map data. That is, the electronic device 100 according to an embodiment may identify a dynamic object from objects in an image, based on speed information, and generate or modify and refine the map data by using the image data from which the dynamic object is excluded.

For example, the electronic device 100 may obtain speed information with respect to the image data of the first resolution. The speed information may include, for example, a speed value corresponding to each unit area of the image data. The electronic device 100 may identify the dynamic object included in the image data of the first resolution, based on the speed information with respect to the image data of the first resolution. The electronic device 100 may remove the dynamic object identified in the image data of the first resolution. Also, the electronic device 100 may remove the identified dynamic object from the image data of the second resolution corresponding to the image data of the first resolution.

Also, the electronic device 100 may generate the map data based on the image data of the first resolution and the image data of the second resolution, from which the dynamic object is removed. Thus, the map data according to an embodiment may include the image data of the first resolution including a static object.

Also, when the electronic device 100 modifies and refines the map data, the electronic device 100 may modify and refine the map data based on the image data of the first resolution and the image data of the second resolution, from which the dynamic object is removed. To easily modify and refine the map data, the electronic device 100 may use an area of the image data of the first resolution obtained to modify and refine the map data, the area including the identified static object, rather than a total area thereof.

When an autonomous vehicle drives on a road, the autonomous vehicle may generate and modify and refine map data about a surrounding environment by using various pieces of sensor information and estimate a current location of the vehicle on the map data. Here, as the vehicle contains more precise map data, a more accurate location of the vehicle may be estimated on the map data.

Also, FIG. 1 illustrates that the electronic device 100 is included in the vehicle 1. However, it is not limited thereto. According to an embodiment, a movable device or robot (not shown) may include the electronic device 100.

Also, the electronic device 100 according to an embodiment may generate the map data by using the image data of the first resolution including a distribution chart based on information sensed at a certain location. For example, the electronic device 100 may obtain an indoor temperature or dust distribution chart, or an indoor wireless signal strength distribution chart, as the image data of the first resolution, from each node, and may obtain location information based on the image data of the second resolution. The electronic device 100 may match the location information with the image data of the first resolution obtained from each node, to generate the map data including the indoor temperature or dust distribution chart, or the indoor wireless signal strength distribution chart.

Figure 2:
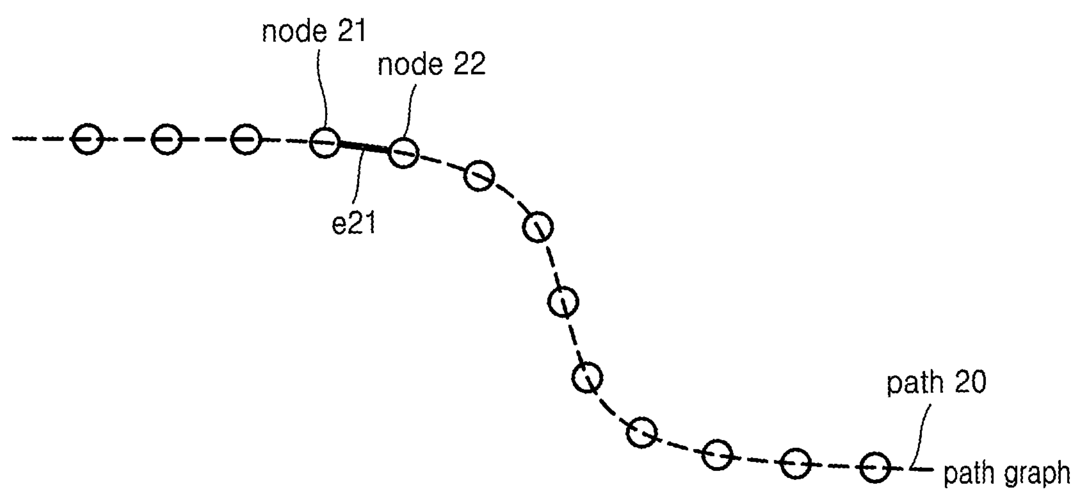
FIG. 2 shows an example path graph including a plurality of nodes according to an embodiment.

FIG. 2 shows an example path graph including a plurality of nodes according to an embodiment.

Referring to FIG. 2, the electronic device 100 may generate a path graph as a set of at least two nodes and edges between the at least two nodes. The graph may be generated by indicating the plurality of nodes as dots and connecting the adjacent nodes via edges. For example, the path graph p20 may include an edge e21 connecting a node 21 and a node 22.

Each of the nodes 21 and 22 may include pose information of the electronic device 100 according to an embodiment and the edge 21 may include a difference value between pose information of adjacent nodes. The electronic device 100 according to an embodiment may obtain at least one of a difference value and a covariance between pose information of the adjacent nodes, as a value of the edge e21 between the two nodes, based on the image data of the second resolution corresponding to each of the nodes 21 and 22. The covariance may indicate a degree in which values of the pose information of the two nodes are changed in a correlated manner. According to an embodiment, based on at least one of the difference value and the covariance, the pose information of the node 22 may be obtained from the pose information of the node 21.

For example, the electronic device 100 may obtain the pose information with respect to at least one node connected to an edge, based on a value of an edge. For example, the electronic device 100 may obtain the pose information of the at least one node, at which the pose information has the least error, based on at least one edge value.

For example, the electronic device 100 may obtain at least one of the difference value and the covariance of the pose information, by comparing image data of the node 21 with image data of the node 22. The pose information of the node 21 may include a pre-obtained value or a pre-defined value based on a certain condition, according to pose information of a previous node adjacent to the node 21. Thus, according to an embodiment, the electronic device 100 may obtain the pose information of the node 22, based on the pose information of the node 21 and the value of the edge e21.

Also, the electronic device 100 may obtain location information of each node, by using the pose information of each node. For example, based on information about a moving distance and a moving direction of the electronic device 100, the information being included in the pose information, the location information of the current node may be obtained from the location information of the previous node of the electronic device 100.

Figure 3:
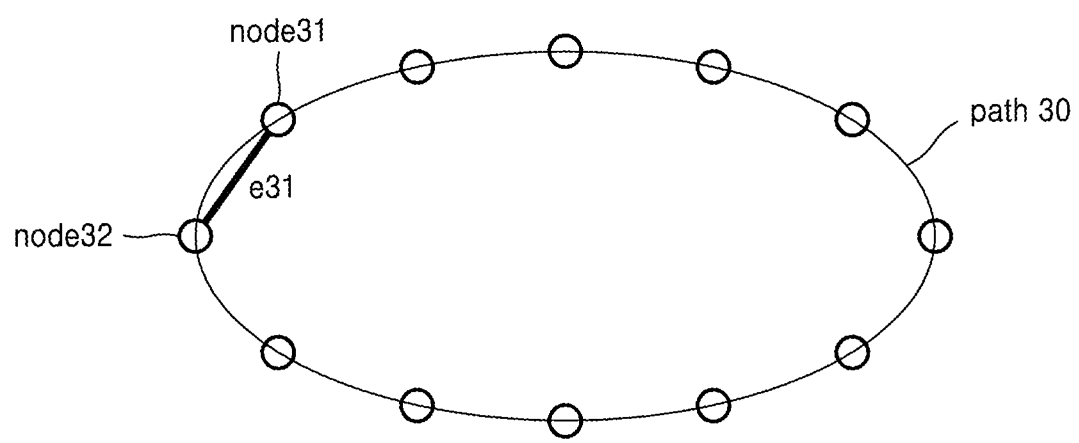
FIG. 3 shows an example of loop-closing according to an embodiment.

FIG. 3 shows an example of loop-closing according to an embodiment.

According to an embodiment, the electronic device 100 may correct the pose information of each node such that a sum of error values of edges included in a path graph is minimized.

According to an embodiment, the electronic device 100 may use simultaneous localization and mapping (SLAM) technologies, in which a moving vehicle or robot measures its location while simultaneously writing a map of a surrounding environment. The electronic device 100 may perform loop-closing based on a relative location of two adjacent nodes, by using graph-based SLAM technologies. The electronic device 100 may generate a loop-closure edge connecting two nodes, by using a relative distance, a relative angle, etc., between two nodes, to derive a corrected resultant value.

Referring to a path graph path 30 of FIG. 3, the electronic device 100 may move in a counterclockwise direction from a node 31 to a node 32. When the node 31 and the node 32 are located at the same location, the electronic device 100 may obtain optimized pose information having the least error, based on a value of at least one edge including an edge e31 included in the path graph path 30, according to the loop-closing correction method. For example, with the node 31 and the node 32 having the same location information as a pre-requisite condition, the optimized pose information of each node may be obtained.

However, it is not limited to the example described above. The electronic device 100 may obtain the pose information of each node, by using various methods of optimizing the pose information, in addition to the loop-closing correction method.

According to an embodiment, the electronic device 100 may obtain the value of the at least one edge included in the path graph path 30, by using the image data of the second resolution for each node of the path graph path 30. Also, the electronic device 100 may obtain the pose information of at least one node included in the path graph path 30, the node being configured to have the least error, based on the value of the at least one edge. The electronic device 100 may obtain location information of each node, based on the pose information of each node.

Figure 4:
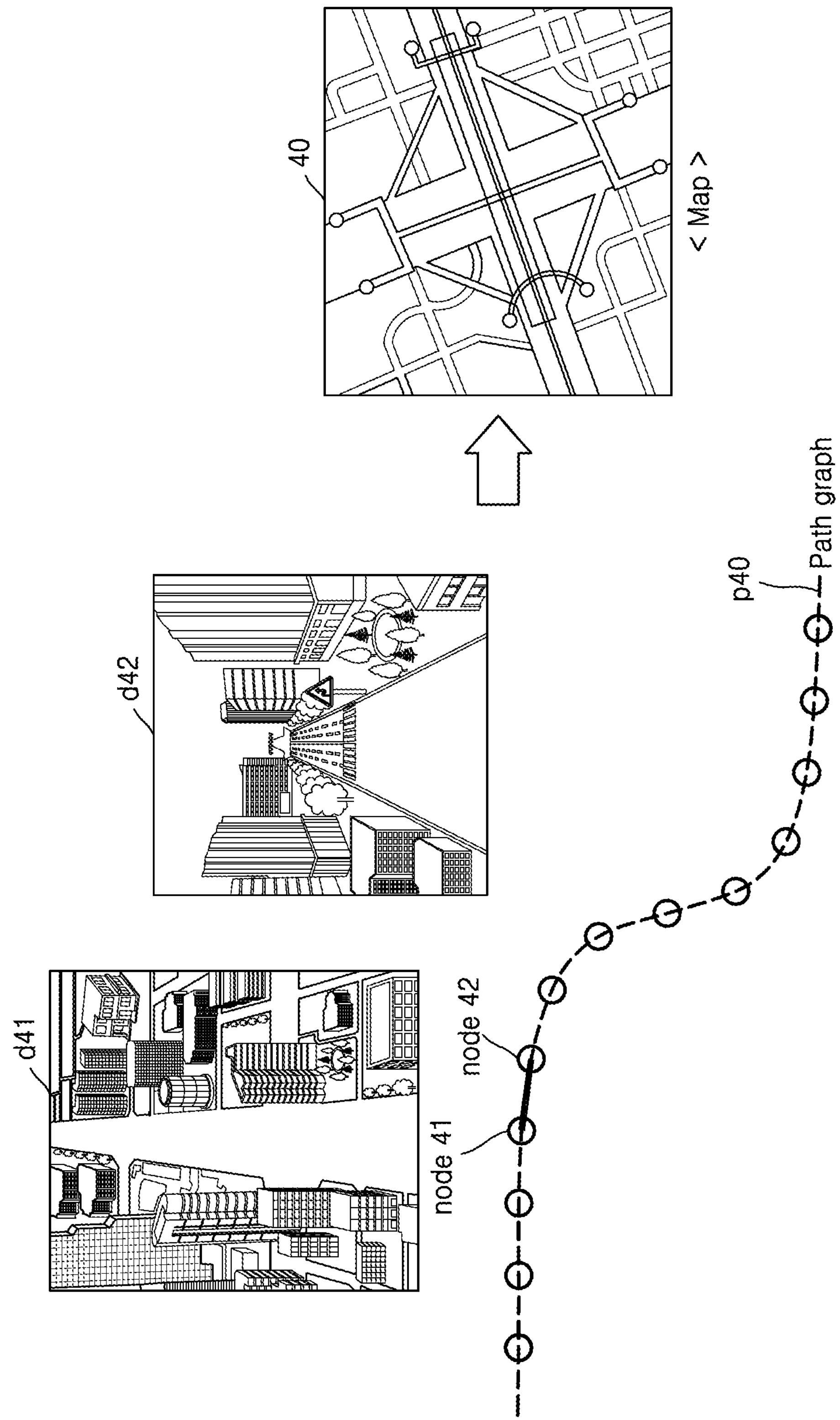
FIG. 4 is a view for describing an example of generating map data according to an embodiment.

FIG. 4 is a view for describing an example of generating map data according to an embodiment.

Referring to FIG. 4, for example, the electronic device 100 may generate map data 40 including image data d41 corresponding to a node 41 and image data d42 corresponding to a node 42. The image data d41 and d42 may be the image data of the first resolution (low resolution) described above. According to an embodiment, the electronic device 100 may generate the map data by storing image data of a first resolution and location information, corresponding to each node.

According to an embodiment, the map data may be realized in the form of a 3D point cloud map, a 2D grid map, a 3D voxel map, etc., based on the image data of the first resolution and the location information, but is not limited thereto. Also, according to an embodiment, the map data may be realized in the various forms (for example, a feature map, a semantic map, a dense map, a texture map, etc.) according to types of data included in a map when the map is generated.

For example, the electronic device 100 may generate the map data in the form of the 3D point cloud map, by using image data in a 3D point cloud form corresponding to each node, based on location information of each node of a corrected path graph. The image data may be, for example, the image data of the first resolution. Also, the electronic device 100 may generate the map data generated by converting the image data in the 3D point cloud form corresponding to each node into a 3D voxel form. Also, the electronic device 100 may generate the map data in a 2D grid form by using only a point cloud corresponding to each node or a ground surface of a road extracted from image data in an image form.

Figure 5:
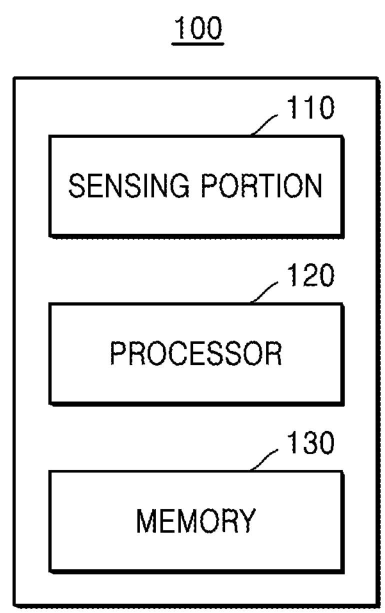
FIG. 5 is a block diagram of an electronic device according to an embodiment.

FIG. 5 is a block diagram of an electronic device according to an embodiment.

According to an embodiment, the electronic device 100 may include the sensing portion 110, a processor 120, and a memory 130. FIG. 5 illustrates only components of the electronic device 100, the components being related to the present embodiment. Thus, it will be understood by one of ordinary skill in the art that other general-purpose components than the components illustrated in FIG. 5 may further be included.

According to an embodiment, the sensing portion 110 may obtain a peripheral image including objects located around the vehicle 1 (FIG. 1) driving on a road. Also, the sensing portion 110 according to an embodiment may obtain the peripheral image described above as image data of different resolutions.

The sensing portion 110 may include a plurality of sensors configured to obtain the peripheral image. For example, the sensing portion 110 may include a distance sensor, such as a lidar sensor and a radar sensor, and an image sensor, such as a camera.

According to an embodiment, the lidar sensor of the sensing portion 110 may generate the image data of the second resolution (for example, the high resolution) described above, and the radar sensor may generate the image data of the first resolution (for example, the low resolution).

Also, the sensing portion 110 may include one or more actuators configured to correct locations and/or alignments of the plurality of sensors, and thus may sense an object located at each of a front direction, a rear direction, and side directions of the vehicle 1.

Also, the sensing portion 110 may sense a shape of a peripheral object and a shape of a road by using the image sensor.

According to an embodiment, the processor 120 may include at least one processor. Also, the processor 120 may execute one or more instructions stored in the memory 130.

According to an embodiment, the processor 120 may generate map data by using the image data of different resolutions. For example, the processor 120 may obtain location information of a plurality of nodes by using image data of a second resolution (for example, a high resolution). Also, the processor 120 may generate the map data by matching the location information of each node with image data of a first resolution (for example, a low resolution) of each node.

Also, the processor 120 may obtain the location information of each node by using image data of a second resolution (for example, a high resolution). For example, the processor 120 may obtain pose information of the electronic device 100 by using the image data of the second resolution (for example, the high resolution) and obtain the location information of each node by using the pose information of the electronic device 100.

Also, the processor 120 may obtain at least one of a difference value and a covariance between pose information of a first node and a second node, and based on the obtained at least one, may obtain the location information of the second node from the location information of the first node.

Also, the processor 120 may obtain the at least one of the difference value and the covariance between the pose information described above by comparing the image data of the second resolution with respect to the first node and the second node. The pose information described above may include 6-degree-of-freedom information of the electronic device 100.

Also, the processor 120 may determine a range of a current location based on information about the current location obtained in various methods and may estimate the current location based on map data corresponding to at least one node included in the determined range. For example, the range of the current location may be determined based on at least one of information about a previous location of the electronic device and GPS information about the current location of the electronic device. Also, the map data corresponding to the at least one node included in the range of the current location may include at least one piece of image data of a first resolution corresponding to the at least one node.

Also, the processor 120 may identify a dynamic object in the image data of the first resolution, based on speed information with respect to the image data of the first resolution. The processor 120 may remove the identified dynamic object from at least one of the image data of the first resolution and the image data of the second resolution. Thus, the processor 120 may generate the map data by using the image data from which the dynamic object is removed.

The memory 130 according to an embodiment may store one or more instructions performed by the processor 120. For example, the memory 130 may store various data and programs for driving and controlling the electronic device 100 under control of the processor 120. Also, the memory 130 may store signals or data that is input/output based on operations of the sensing portion 110 and the processor 120.

The memory 130 may store the map data generated by the processor 120 under control of the processor 120.

Figure 6:
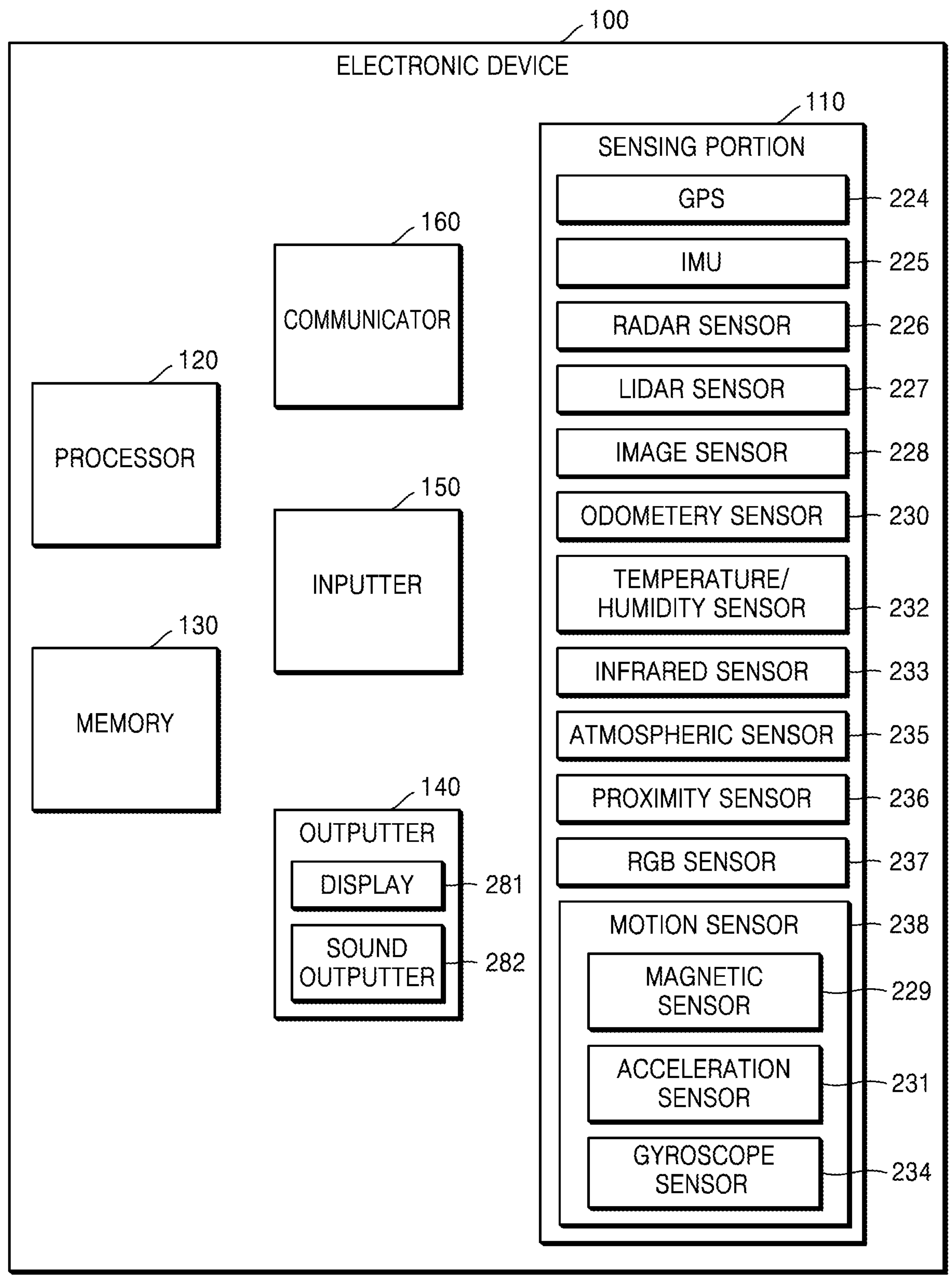
FIG. 6 is a block diagram of an electronic device according to an embodiment.

FIG. 6 is a block diagram of an electronic device according to an embodiment.

The electronic device 100 may include the sensing portion 110, the processor 120, the memory 130, an outputter 140, an inputter 150, and a communicator 160. The electronic device 100, the sensing portion 110, the processor 120, and the memory 130 illustrated in FIG. 6 may correspond to the electronic device 100, the sensing portion 110, the processor 120, and the memory 130 of FIG. 5, respectively.

The sensing portion 110 may include a plurality of sensors configured to sense information about a surrounding environment in which the vehicle (FIG. 1) is located and may include one or more actuators configured to correct locations and/or alignments of the sensors. For example, the sensing portion 110 may include a GPS 224, an inertial measurement unit (IMU) 225, a radar sensor 226, a lidar sensor 227, an image sensor 228, and an odometery sensor 230. Also, the sensing portion 110 may include at least one of a temperature/humidity sensor 232, an infrared sensor 233, an atmospheric sensor 235, a proximity sensor 236, and an RGB illuminance sensor 237, but is not limited thereto. A function of each sensor may be intuitively inferred by one of ordinary skill in the art based on a name of the sensor, and thus, its detailed description is omitted.

Also, the sensing portion 110 may include a motion sensing portion 238 configured to sense a motion of the vehicle 1 (FIG. 1). The motion sensing portion 238 may include a magnetic sensor 229, an acceleration sensor 231, and a gyroscope sensor 234.

The GPS 224 may include a sensor configured to estimate a geographical location of the vehicle 1 (FIG. 1). That is, the GPS 224 may include a transceiver configured to estimate a location of the vehicle 1 (FIG. 1) on the earth. According to an embodiment, a range of a current location of the vehicle 1 may be determined based on GPS information with respect to the current location of the vehicle 1. The current location of the vehicle 1 may be estimated based on the map data obtained based on the determined range.

The IMU 225 may be a combination of sensors configured to sense changes of a location and an alignment of the vehicle 1 (FIG. 1) based on inertia acceleration. For example, the combination of sensors may include accelerometers and gyroscopes.

The radar sensor 226 may include a sensor configured to sense objects in an environment in which the vehicle 1 (FIG. 1) is located, by using wireless signals. Also, the radar sensor 226 may be configured to sense a speed and/or a direction of objects.

The lidar sensor 227 may include a sensor configured to sense objects in an environment in which the vehicle 1 (FIG. 1) is located, by using a laser beam. In more detail, the lidar sensor 227 may include a laser light source and/or a laser scanner configured to emit a laser beam, and a sensor configured to sense reflection of the laser beam. The lidar sensor 227 may be configured to operate in a coherent (for example, using heterodyne sensing) or an incoherent sensing mode.

The image sensor 228 may include a still camera or a video camera configured to record an environment outside the vehicle 1 (FIG. 1). For example, the image sensor 228 may include a plurality of cameras and the plurality of cameras may be arranged at various locations inside and outside of the vehicle 1 (FIG. 1).

The odometery sensor 230 may estimate the location of the vehicle 1 (FIG. 1) and measure a moving distance. For example, the odometery sensor 230 may measure a value of a location change of the vehicle 1 (FIG. 1) by using the number of rotations of a wheel of the vehicle 1 (FIG. 1).

Also, the location of the electronic device 100 may be measured by using the methods of trilateration, triangulation, etc., using sensors and communication devices, such as 3G, LTE, a global navigation satellite system (GNSS), a global system for mobile communication (GSM), LORAN-C, NELS, WLAN, Bluetooth, etc.

Also, when the electronic device 100 is in an indoor environment, a location of the electronic device 100 may be estimated by using sensors, such as indoor-GPS, Bluetooth, WLAN, VLC, active badge, GSM, RFID, visual tags, WIPS, WLAN, ultraviolet rays, magnetic sensors, etc.

The method of measuring the location of the electronic device 100 according to an embodiment is not limited to the examples described above. Other methods, in which location data of the electronic device 100 may be obtained, may also be used.

The memory 130 may include a magnetic disk drive, an optical disk drive, and a flash memory. Alternatively, the memory 130 may include a portable USB data storage. The memory 130 may store system software configured to execute examples related to the disclosure. The system software configured to execute the examples related to the disclosure may be stored in a portable storage medium.

The communicator 160 may include at least one antenna for wirelessly communicating with other devices. For example, the communicator 160 may be used to wirelessly communicate with cellular networks or other wireless protocols and systems through Wi-Fi or Bluetooth. The communicator 160 controlled by the processor 120 may transmit and receive wireless signals. For example, the processor 120 may execute a program included in the storage 140 for the communicator 160 to transmit and receive wireless signals to and from the cellular network.

The inputter 150 refers to a device for inputting data for controlling the vehicle 1 (FIG. 1). For example, the inputter 150 may include a key pad, a dome switch, a touch pad (a touch capacitance method, a pressure-resistive layer method, an infrared sensing method, a surface ultrasonic conductive method, an integral tension measuring method, a piezo effect method, etc.), a jog wheel, a jog switch, etc., but is not limited thereto. Also, the inputter 150 may include a microphone, which may be configured to receive audio (for example, a voice command) from a passenger of the vehicle 1 (FIG. 1).

The outputter 140 may output an audio signal or a video signal, and an output device 280 may include a display 281 and a sound outputter 282.

The display 281 may include at least one of a liquid crystal display, a thin-film transistor-liquid crystal display, an organic light-emitting diode, a flexible display, a 3D display, and an electrophoretic display. According to a realized form of the outputter 130, the outputter 140 may include at least two displays 281.

The sound outputter 282 may output audio data received from the communicator 160 or stored in the storage 140. Also, the sound outputter 282 may include a speaker, a buzzer, etc.

The inputter 150 and the outputter 140 may include a network interface and may be realized as a touch screen.

The processor 120 may execute programs stored in the memory 130 to generally control the sensing portion 110, the communicator 160, the inputter 150, the storage 140, and the outputter 140.

Figure 7:
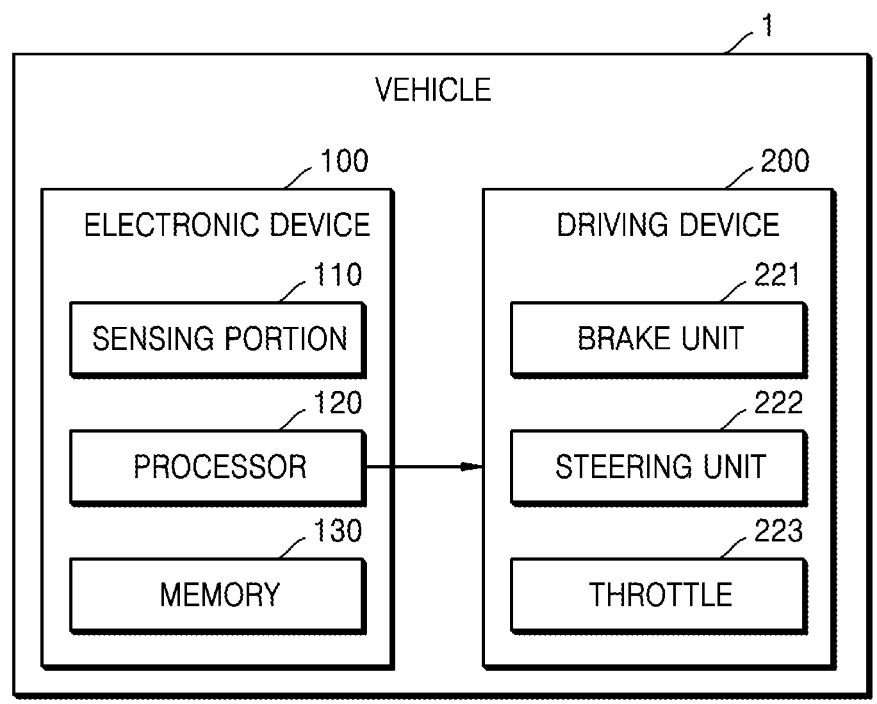
FIG. 7 is a block diagram of a vehicle according to an embodiment.

FIG. 7 is a block diagram of a vehicle according to an embodiment.

According to an embodiment, the vehicle 1 may include the electronic device 100 and a driving device 200. FIG. 7 illustrates only components of the vehicle 1, the components being related to the present embodiment. Thus, it will be understood by one of ordinary skill in the art that other general-purpose components than the components illustrated in FIG. 7 may further be included.

The electronic device 100 may include the sensing portion 110, the processor 120, and the memory 130.

The sensing portion 110, the processor 120, and the memory 130 are described in detail in FIGS. 5 and 6, and thus, their descriptions are omitted.

The driving device 200 may include a brake unit 221, a steering unit 222, and a throttle 223.

The steering unit 222 may be a combination of mechanisms configured to adjust a direction of the vehicle 1.

The throttle 223 may be a combination of mechanisms configured to control a speed of the vehicle 1 by controlling an operating speed of an engine/motor 211. Also, the throttle 223 may adjust an amount of mixture gas of fuel air inserted into the engine/motor 211 by adjusting an opening amount of the throttle and may control power and a driving force by adjusting the opening amount of the throttle.

The brake unit 221 may be a combination of mechanisms configured to decelerate the vehicle 1. For example, the brake unit 221 may use friction to reduce a speed of a wheel/tire 214.

Figure 8:
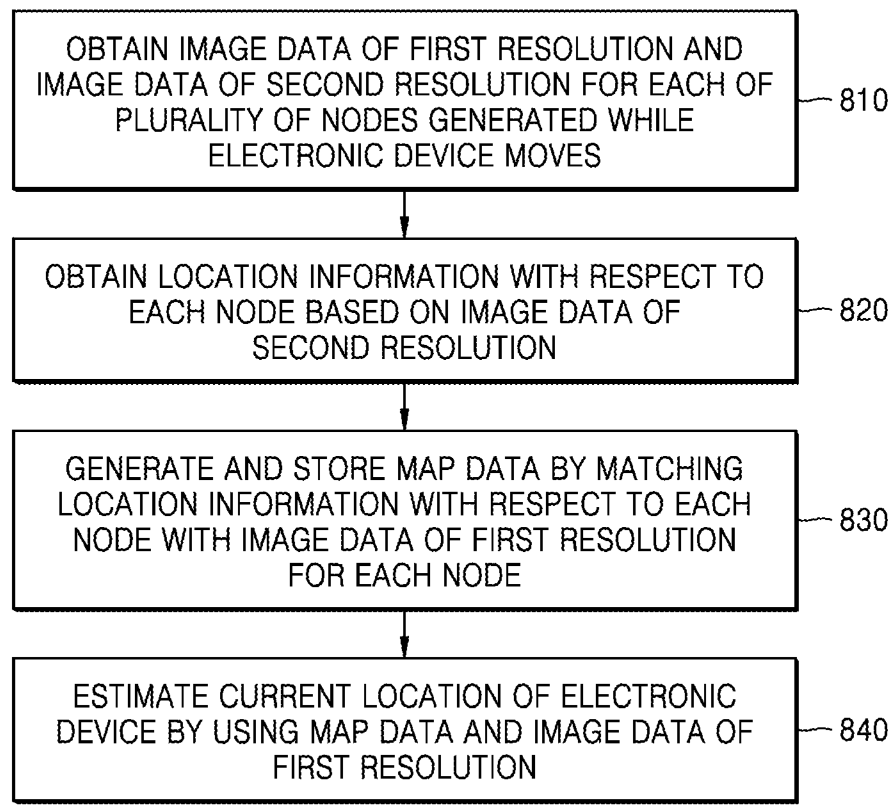
FIG. 8 is a flowchart of an operating method of an electronic device according to an embodiment.

FIG. 8 is a flowchart of an operating method of an electronic device according to an embodiment.

Referring to FIG. 8, in operation 810, the electronic device 100 may obtain image data of a first resolution and image data of a second resolution for each of a plurality of nodes generated while the electronic device 100 moves. The electronic device 100 according to an embodiment may obtain image data of different resolutions at each of the nodes, by using different sensors.

In operation 820, the electronic device 100 may obtain location information with respect to each node based on the image data of the second resolution.

The electronic device 100 according to an embodiment may compare the image data of the second resolution with respect to the first node and the second node, to obtain at least one of a difference value and a covariance between pose information of a first node and a second node as a value of an edge between the two nodes. According to an embodiment, the first node and the second node may be a previous node and a current node of the electronic device 100, respectively. The covariance may indicate a degree in which values of the pose information of the two nodes are changed in a correlated manner. According to an embodiment, based on at least one of the difference value and the covariance, the pose information of the second node may be obtained from the pose information of the first node.

Also, the electronic device 100 may obtain the pose information of the second node based on the value of the edge and the pose information of the first node. Alternatively, the electronic device 100 may obtain the pose information of at least one optimized node, according to a loop-closing correction method, based on the value of the edge. The electronic device 100 may obtain location information of the current node based on the pose information of each node.

The electronic device 100 according to an embodiment may obtain location information having high accuracy by using image data of a high resolution, through which feature values of the image data may be distinctly compared.

In operation 830, the electronic device 100 may match and store the location information for each node obtained in operation S820 and the image data of the first resolution. The electronic device 100 may generate the map data by matching and storing the location information for each node and the image data of the first resolution.

In operation 840, the electronic device 100 may estimate the current location of the electronic device 100 by using the map data generated in operation 840 and the image data of the first resolution. The image data of the first resolution may be image data obtained at the current location of the electronic device 100. According to an embodiment, the electronic device 100 may estimate the current location of the electronic device 100 by comparing the image data of the first resolution obtained at the current location with the image data of the first resolution included in the map data. For example, the electronic device 100 may determine, from the image data of the first resolution included in the map data, image data of the first resolution mostly closely matched to the image data of the first resolution obtained at the current location. The electronic device 100 may estimate the location information corresponding to the determined image data of the first resolution as the current location of the electronic device 100.

The device according to the embodiments described herein may include a processor, a memory for storing program data and executing it, a permanent storage such as a disk drive, a communication port for handling communications with external devices, and user interface devices, such as touch panels, keys, buttons, etc. Any methods implemented as software modules or algorithms may be stored as program instructions or computer-readable codes executable by a processor on a computer-readable recording media. Here, the computer-readable recording media may include magnetic storage media (for example, read-only memory (ROM), random-access memory (RAM), floppy disks, hard disks, etc.) and optical reading media (for example, CD-ROMs, digital versatile disc (DVD), etc.). The computer-readable recording medium can also be distributed over network-coupled computer systems so that the computer-readable code is stored and executed in a distributed fashion. The media can be read by the computer, stored in the memory, and executed by the processor.

The present embodiment may be described in terms of functional block components and various processing steps. Such functional blocks may be realized by any number of hardware and/or software components configured to perform the specified functions. For example, the embodiment may employ various integrated circuit components, e.g., memory elements, processing elements, logic elements, look-up tables, and the like, which may carry out a variety of functions under the control of one or more microprocessors or other control devices. Similarly, where the elements of the present embodiment are implemented using software programming or software elements the embodiment may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present embodiment could employ any number of conventional techniques for electronics configuration, signal processing and/or control, data processing and the like. The words "mechanism," "element," and "component" are used broadly and are not limited to mechanical or physical embodiments. The meaning of these words can include software routines in conjunction with processors, etc.

What is claimed is:

1. An operating method of an electronic device, the method comprising:

obtaining image data of a first resolution and image data of a second resolution for each of a plurality of nodes generated while the electronic device moves;

obtaining location information with respect to each of the generated nodes based on the image data of the second resolution;

generating and storing map data by matching the obtained location information with the image data of the first resolution for each node; and estimating a current location of the electronic device based on the generated map data and the image data of the first resolution, wherein the obtaining the location information with respect to each of the generated nodes comprises:

obtaining at least one of a difference value and a covariance of pose information of the electronic device between a first node and a second node, based on the image data of the second resolution; and obtaining the location information with respect to the second node from the location information with respect to the first node, based on the obtained at least one of the difference value and the covariance of the pose information.

2. The method of claim 1, wherein the obtaining of the at least one of the difference value and the covariance of the pose information of the electronic device comprises:

comparing the image data of the second resolution for the first node and the second node; and obtaining the at least one of the difference value and the covariance of the pose information of the electronic device, based on a result of the comparing.

3. The method of claim 1, wherein the pose information of the electronic device comprises 6-degree-of-freedom information of the electronic device.

4. The method of claim 1, wherein the estimating the current location of the electronic device based on the generated map data and the image data of the first resolution comprises:

obtaining at least one of information about a previous location of the electronic device or global positioning system (GPS) information about the current location of the electronic device;

determining a range for the current location of the electronic device, based on the obtained at least one of information about a previous location of the electronic device and GPS information;

obtaining map data corresponding to at least one node included in the determined range; and estimating the current location of the electronic device based on the obtained map data.

5. The method of claim 1, wherein the image data of the first resolution is obtained by a radar sensor, and the image data of the second resolution is obtained by at least one of a lidar sensor and an image sensor.

6. The method of claim 1, wherein the obtaining the image data of the first resolution and the image data of the second resolution comprises:

obtaining speed information with respect to the image data of the first resolution;

identifying a dynamic object included in the image data of the first resolution, based on the obtained speed information; and removing the identified dynamic object from at least one of the image data of the first resolution and the image data of the second resolution.

7. An electronic device comprising:

at least one sensor configured to obtain image data of a first resolution and image data of a second resolution for each of a plurality of nodes generated while the electronic device moves;

a memory storing one or more instructions; and a processor configured to execute the one or more instructions stored in the memory to:

obtain location information with respect to each of the generated nodes based on the image data of the second resolution;

generate map data by matching the obtained location information with the image data of the first resolution for each node;

store the generated map data in the memory; and estimate a current location of the electronic device based on the generated map data and the image data of the first resolution wherein the processor is further configured to:

obtain at least one of a difference value and a covariance of pose information of the electronic device between a first node and a second node, based on the image data of the second resolution, and obtain the location information of the second node from the location information of the first node, based on the obtained at least one of the difference value and the covariance of the pose information.

8. The electronic device of claim 7, wherein the processor is further configured to:

compare the image data of the second resolution for the first node and the second node; and obtain the at least one of the difference value and the covariance of the pose information of the electronic device based on a result of the comparing.

9. The electronic device of claim 7, wherein the pose information of the electronic device comprises 6-degree-of-freedom information of the electronic device.

10. The electronic device of claim 7, wherein the processor is further configured to:

obtain at least one of information about a previous location of the electronic device and global positioning system (GPS) information about a current location of the electronic device;

determine a range for the current location of the electronic device based on the obtained at least one of information about a previous location of the electronic device and GPS information;

obtain map data corresponding to at least one node included in the determined range; and estimate the current location of the electronic device based on the obtained map data.

11. The electronic device of claim 7, wherein the image data of the first resolution is obtained by a radar sensor, and the image data of the second resolution is obtained by at least one of a lidar sensor and an image sensor.

12. The electronic device of claim 7, wherein the processor is further configured to:

obtain speed information with respect to the image data of the first resolution;

identify a dynamic object included in the image data of the first resolution, based on the obtained speed information; and remove the identified dynamic object from at least one of the image data of the first resolution and the image data of the second resolution.

13. A non-transitory computer-readable recording medium having recorded thereon a program which, when executed by a processor of an electronic device, causes the electronic device to perform operations comprising:

obtaining image data of a first resolution and image data of a second resolution for each of a plurality of nodes generated while the electronic device moves;

obtaining location information with respect to each of the generated nodes based on the image data of the second resolution;

generating and storing map data by matching the obtained location information with the image data of the first resolution for each node; and estimating a current location of the electronic device based on the generated map data and the image data of the first resolution, wherein the obtaining the location information with respect to each of the generated nodes further comprises:

obtaining at least one of a difference value and a covariance of pose information of the electronic device between a first node and a second node, based on the image data of the second resolution; and obtaining the location information with respect to the second node from the location information with respect to the first node, based on the obtained at least one of the difference value and the covariance of the pose information.

14. The non-transitory computer-readable recording medium of claim 13, wherein the program, when executed, causes the electronic device to obtain the at least one of the difference value and the covariance of the pose information of the electronic device by operations comprising:

comparing the image data of the second resolution for the first node and the second node; and obtaining the at least one of the difference value and the covariance of the pose information of the electronic device, based on a result of the comparing.

15. The non-transitory computer-readable recording medium of claim 13, wherein the pose information of the electronic device comprises 6-degree-of-freedom information of the electronic device.

16. The non-transitory computer-readable recording medium of claim 13, wherein the program, when executed, causes the electronic device to estimate the current location of the electronic device based on the generated map data and the image data of the first resolution by operations comprising:

obtaining at least one of information about a previous location of the electronic device and global positioning system (GPS) information about the current location of the electronic device;

determining a range for the current location of the electronic device, based on the obtained at least one of information about a previous location of the electronic device and GPS information;

obtaining map data corresponding to at least one node included in the determined range; and estimating the current location of the electronic device based on the obtained map data.

17. The non-transitory computer-readable recording medium of claim 15, wherein the program, when executed, causes the electronic device to obtain the image data of the first resolution and the image data of the second resolution by operations comprising:

obtaining speed information with respect to the image data of the first resolution;

identifying a dynamic object included in the image data of the first resolution, based on the obtained speed information; and removing the identified dynamic object from at least one of the image data of the first resolution and the image data of the second resolution.

* * * * *